United States Patent
Hu et al.

(10) Patent No.: US 7,072,790 B2
(45) Date of Patent: Jul. 4, 2006

(54) SHAFT SENSORLESS ANGULAR POSITION AND VELOCITY ESTIMATION FOR A DYNAMOELECTRIC MACHINE BASED ON EXTENDED ROTOR FLUX

(75) Inventors: Jun Hu, Roscoe, IL (US); Charles Romenesko, Roscoe, IL (US); Albert L. Markunas, Roscoe, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 106 days.

(21) Appl. No.: 10/917,018

(22) Filed: Aug. 12, 2004

(65) Prior Publication Data

US 2006/0052972 A1    Mar. 9, 2006

(51) Int. Cl.
*H02K 24/00*    (2006.01)
(52) U.S. Cl. ...................................... 702/147
(58) Field of Classification Search ................. 702/147
See application file for complete search history.

(56) References Cited

U.S. PATENT DOCUMENTS 5,461,293 A * 10/1995 Rozman et al. ............. 318/603

* cited by examiner

Primary Examiner—Bryan Bui
Assistant Examiner—Tung Lau
(74) Attorney, Agent, or Firm—Stephen G. Mican (57) ABSTRACT

A shaft sensorless rotor angular position and velocity sensing system for a ynamoelectric machine that includes: a reference frame transformation function for transforming measured currents and potentials applied to a stator of the dynamoelectric machine to a two-phase $\alpha$-$\beta$ stationary frame to produce transformed currents $I_\alpha, I_\beta$ and transformed potentials $V_\alpha, V_\beta$; first and second multipliers to produce signals $I_\alpha * R_S, I_\beta * R_S$; first and second summers to produce signals $V_\alpha - I_\alpha * R_S, V_\beta - I_\beta * R_S$; first and second lag functions to produce signals

$$\frac{1}{s+\omega_i}(V_\alpha - I_\alpha * R_s), \frac{1}{s+\omega_i}(V_\beta - I_\beta * R_s);$$

third and fourth multipliers to produce signals $I_\alpha * L_q, I_\beta * L_q$; third and fourth summers to produce signals $$\frac{1}{s+\omega_i}(V_\alpha - I_\alpha * R_s) - I_\alpha * L_q, \frac{1}{s+\omega_i}(V_\beta - I_\beta * R_s) - I_\beta * L_q$$

that correspond to extended rotor flux values $\lambda_{ext\_\alpha}, \lambda_{ext\_\beta}$; and a phase lock loop (PLL) to derive estimated rotor angular position and velocity values $\hat{\theta}, \hat{\omega}$ for the dynamoelectric machine from the extended rotor flux values $\lambda_{ext\_\alpha}, \lambda_{ext\_\beta}$.

26 Claims, 2 Drawing Sheets

PI: Proportional and Integral regulator
LPF: Low pass filter

SHAFT SENSORLESS ANGULAR POSITION AND VELOCITY ESTIMATION FOR A DYNAMOELECTRIC MACHINE BASED ON EXTENDED ROTOR FLUX

FIELD OF THE INVENTION

The invention relates to rotor angular position and velocity sensing systems for mechanical shaft sensorless control of dynamoelectric machines, and more particularly to an improved system for resolving the position of a rotor for a dynamoelectric machine using an estimate of extended rotor flux.

BACKGROUND OF THE INVENTION

A polyphase alternating current (AC) dynamoelectric machine can be used as a motor or a generator. In aeronautical applications, it is desirable to use a single machine for a starter motor and a generator to reduce size and weight. An aircraft generator can be used as a motor to start the propulsion engine for the aircraft when it is powered by an inverter.

To reduce cost and improve reliability, it is very desirable for the engine starter to eliminate mechanical shaft sensor. In general, there are two categories in sensorless motor control, the back EMF based method and the signal injection method. The back EMF based method is easy to implement, and usually works quite well at high angular rotor velocity, but it is inadequate for low velocity or standstill. The signal injection method is more difficult to implement, but it is preferred for operation at low angular rotor velocity or standstill. Most systems that utilise the signal injection method are also subject to a 180 degree rotor position anomaly because these systems are not able to recognise if they are locking onto the positive or negative pole of the rotor.

SUMMARY OF THE INVENTION

The invention comprises a shaft sensorless rotor angular position and velocity sensing system for a dynamoelectric machine that is based on dynamoelectric machine extended flux estimation. The extended rotor flux aligns with the rotor field flux axis. The rotor angular position and velocity are estimated from the extended rotor flux. The motor flux is reconstructed through dynamoelectric machine terminal potentials and currents. Ideally, a pure integrator should be used to reconstruct the flux. However, in practice, a pure integrator has direct current (DC) drifting and initial value holding problems. The invention employs a special lag function to approximate the pure integrator. The corner frequency of the lag function can be either fixed or adjusted according to the rotor angular velocity of the machine. A digital phase lock loop is employed to determine the rotor position and speed from the extended rotor flux. The estimated position error due to the lag function that is used for integration can be compensated to improve estimation accuracy. The final estimated position and speed are then used for field-oriented control (FOC).

In a preferred embodiment, the invention performs a method of detecting rotor angular position and velocity for a polyphase alternating current (AC) dynamoelectric machine comprising the steps of:

measuring the AC currents and potentials applied to a stator of the dynamoelectric machine;

transforming the measured currents and potentials to a two-phase $\alpha$-$\beta$ stationary frame to produce transformed currents $I_\alpha, I_\beta$ and transformed potentials $V_\alpha, V_\beta$;

multiplying the transformed currents $I_\alpha, I_\beta$ by the resistance $R_s$ of the stator to produce signals $I_\alpha^* R_s$, $I_\beta^* R_s$;

subtracting the signals $I_\alpha^* R_s$, $I_\beta^* R_s$ from the respective transformed potentials $V_\alpha, V_\beta$; to produce signals $V_\alpha - I_\alpha^* R_s$, $V_\beta - I_\beta^* R_s$;

multiplying signals $V_\alpha - I_\alpha^* R_s, V_\beta - I_\beta^* R_s$ by a lag function $$\frac{1}{s+\omega_i},$$

wherein $\omega_i$ is a selected corner frequency for the lag function, to produce signals $$\frac{1}{s+\omega_i}(V_\alpha - I_\alpha * R_s), \frac{1}{s+\omega_i}(V_\beta - I_\beta * R_s);$$

multiplying the transformed currents $I_\alpha, I_\beta$ by the q-axis inductance $L_q$ of the stator to produce signals $I_\alpha^* L_q, I_\beta^* L_q$;

subtracting the signals $I_\alpha^* L_q$, $I_\beta^* L_q$ from the respective signals $$\frac{1}{s+\omega_i}(V_\alpha - I_\alpha * R_s),$$

$$\frac{1}{s+\omega_i}(V_\beta - I_\beta * R_s)$$

to produce signals $$\frac{1}{s+\omega_i}(V_\alpha - I_\alpha * R_s) - I_\alpha * L_q, \frac{1}{s+\omega_i}(V_\beta - I_\beta * R_s) - I_\beta * L_q$$

that correspond to extended rotor flux values $\lambda_{ext\_\alpha}, \lambda_{ext\_\beta}$; and applying the extended rotor flux values $\lambda_{ext\_\alpha}, \lambda_{ext\_\beta}$ to a phase lock loop (PLL) to derive estimated rotor angular position and velocity values $\hat{\theta}, \hat{\omega}$ for the dynamoelectric machine.

DETAILED DESCRIPTION OF THE INVENTION

Figure 1:
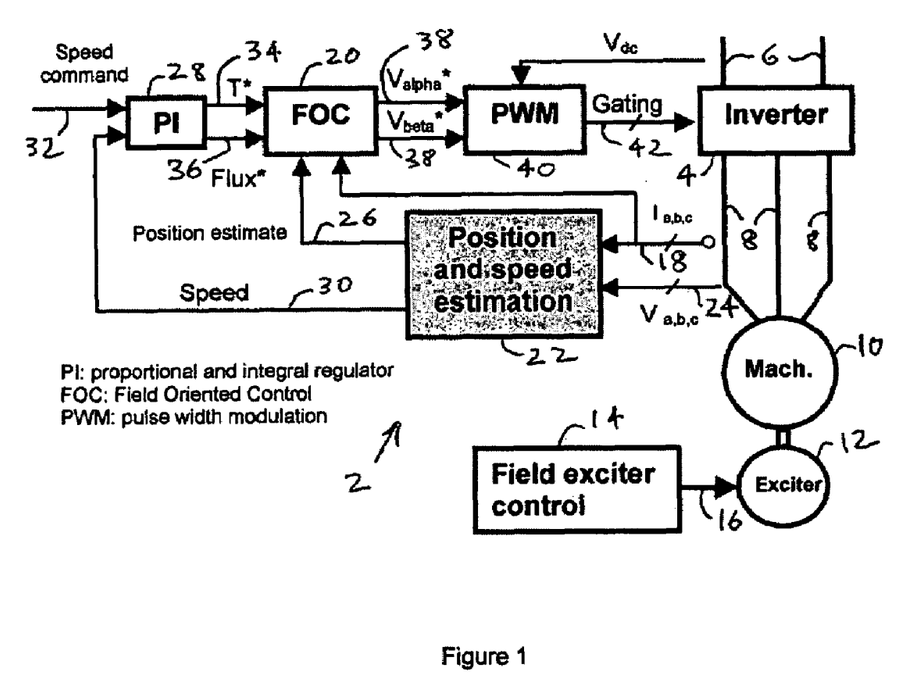
FIG. 1 shows a high level block diagram of a mechanical sensorless rotor angular position and velocity sensing system for a dynamoelectric machine that may incorporate dynamoelectric machine extended flux estimation according to the invention.

FIG. 1 shows a high level block diagram of a sensorless rotor angular position and velocity sensing system 2 for a dynamoelectric machine that may incorporate dynamoelectric machine extended flux estimation according to the invention. A power inverter 4 converts direct current (DC) power supplied on lines 6 to polyphase alternating current (AC) power on lines 8 that supply a stator of a dynamoelectric machine 10. Typically, three phase AC power is supplied to the dynamoelectric machine. The dynamoelectric machine 10 has a rotor that may be energised by an exciter 12. The exciter 12 is controlled by a exciter field controller 14 through signal path 16.

Current level in the lines 8 is measured and a current level signals representative of this level travel down a feedback signal path 18 to a FOC controller 20. An angular position and velocity estimation controller 22 receives both the current level signals on the signal path 18 and potential level signals on a signal path 24 that are representative of the potential on the lines 8. The controller 22 generates angular position and velocity estimate signals that are based on the measured current and potential level signals as explained below. The FOC controller 20 receives the position estimate signal from the controller 22 on a signal path 26. A proportional plus integral (PI) controller 28 receives the velocity estimate signal from the controller 22 on a signal path 30.

The PI controller 28 receives an angular velocity command signal on a signal path 32 and compares it to the velocity estimate signal that it receives on the signal path 30. In response to any difference, the PI controller 28 generates appropriate torque and flux command signals on signal paths 34 and 36, respectively.

The FOC controller 20 receives the torque and flux command signals from the respective signal paths 34 and 36 and generates stationary frame ($\alpha$-$\beta$) command signals on signal paths 38. A pulse width modulator (PWM) 40 receives the stationary frame command signals on the signal paths 38 and generates a corresponding pulse width modulated gating signal on a signal path 42. The inverter 4 receives the modulated gating signal on the signal path 42 and changes the power and frequency of the AC power on the lines 8 in accord with the dynamoelectric machine 10.

The sensing system 2 uses extended rotor flux estimation performed by the angular position and velocity estimation controller 22 to derive the estimated rotor angular position and velocity for the dynamoelectric machine using the measured current and potential level signals on the signal paths 18 and 24, respectively. Flux estimation is done in stationary alpha-beta frame. Since the measured current and potential level signals as shown in FIG. 1 are in three phase a-b-c frame, they must first be transformed by the controller 22 to stationary $\alpha$-$\beta$ frame.

The relationship of $\alpha$-$\beta$ frame and a-b-c frame is described in the following equation, where f can be replaced with voltage, current or flux. Subscripts a, b and c represent variables in a-b-c frame, while $\alpha$ and $\beta$ represent variables in the stationary alpha-beta frame.

$$\begin{bmatrix} f_\alpha \\ f_\beta \end{bmatrix} = \frac{2}{3} \begin{bmatrix} 1 & -1/2 & -1/2 \\ 0 & \sqrt{3}/2 & -\sqrt{3}/2 \end{bmatrix} \begin{bmatrix} f_a \\ f_b \\ f_c \end{bmatrix} \quad (1)$$

After the measured current and potential level signals are transformed to the stationary $\alpha$-$\beta$ frame, the controller 22 derives the extended rotor flux from the transformed measured current and potential level signals. The extended rotor flux is defined in the following equation, where $\lambda_{ext\_\alpha}$ and $\lambda_{ext\_\beta}$ are the extended rotor flux in $\alpha$-$\beta$ frame, respectively. $V_\alpha$, $V_\beta$, $I_\alpha$ and $I_\beta$ are the transformed measured potentials and currents, respectively. $R_s$ and $L_q$ are the stator resistance and q-axis inductance for the dynamoelectric machine 10.

$$\begin{bmatrix} \lambda_{ext\_\alpha} \\ \lambda_{ext\_\beta} \end{bmatrix} = \frac{1}{s} \left( \begin{bmatrix} V_\alpha \\ V_\beta \end{bmatrix} - \begin{bmatrix} R_s & 0 \\ 0 & R_s \end{bmatrix} \begin{bmatrix} I_\alpha \\ I_\beta \end{bmatrix} \right) - \begin{bmatrix} L_q & 0 \\ 0 & L_q \end{bmatrix} \begin{bmatrix} I_\alpha \\ I_\beta \end{bmatrix} \quad (2)$$

Figure 2:
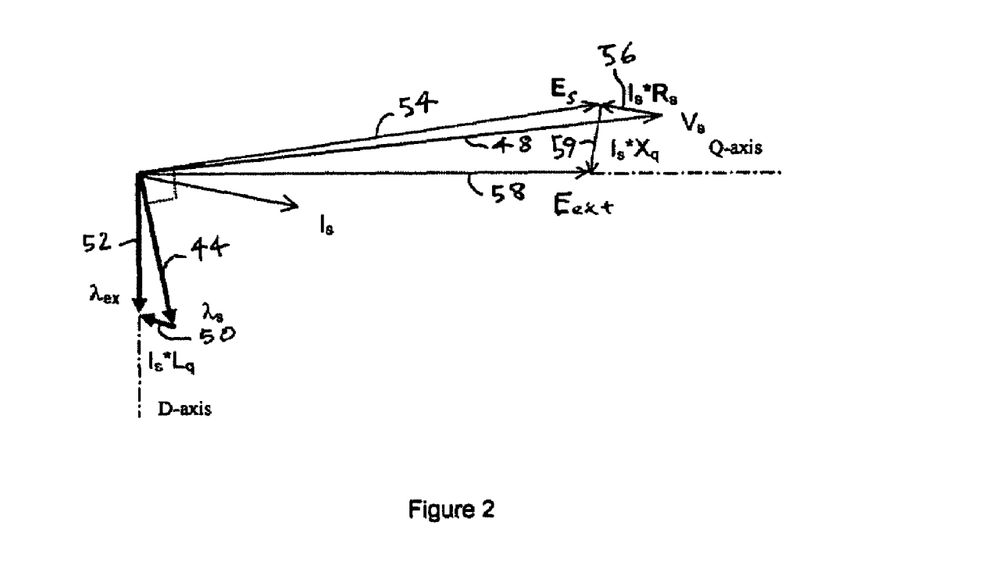
FIG. 2 is a phasor diagram of electrical parameters related to extended rotor flux.

FIG. 2 is a phasor diagram of electrical parameters related to extended rotor flux as defined above. The vertical axis of the diagram represents the d-axis for the rotor of the dynamoelectric machine 10. The horizontal axis represents the q-axis for the rotor of the dynamoelectric machine 10. The d-axis aligns with the rotor excitation field, and the q-axis leads 90 degrees from the d-axis.

The flux $\lambda_s$ in the stator of the dynamoelectric machine 10 is represented by phasor 44. Stator current $I_s$ is represented by phasor 46. Stator potential $V_s$ is represented by phasor 48. Phasor 50 represents $I_s*L_q$, wherein $L_q$ is the q-axis rotor inductance. The vector sum of phasor 44, representing $\lambda_s$, and phasor 50, representing $I_s*L_q$, is the extended rotor flux $\lambda_{ext}$, which aligns with the axis of the rotor of the dynamoelectric machine 10, as represented by phasor 52.

Also shown in FIG. 2 is the effective stator potential $E_s$ represented as phasor 54. As shown, the effective stator potential $E_s$ leads the stator flux $\lambda_s$ by 90 degrees. The effective stator potential $E_s$ represented by phasor 54 is the vector sum of the stator potential $V_s$ represented by phasor 48 and stator resistance potential drop, $I_s*R_s$ represented by phasor 56, wherein $R_s$ is the stator resistance.

Finally, the extended back EMF, $E_{ext}$ in the stator is represented by phasor 58. It extends along the q-axis. $I_s*X_q$, wherein $X_q$ is the q-axis stator reactance, is represented by phasor 59. The extended back EMF represented by phasor 58 is the vector sum of $E_s$ represented by phasor 54 and $I_s*X_q$ represented by phasor 59.

Figure 3:
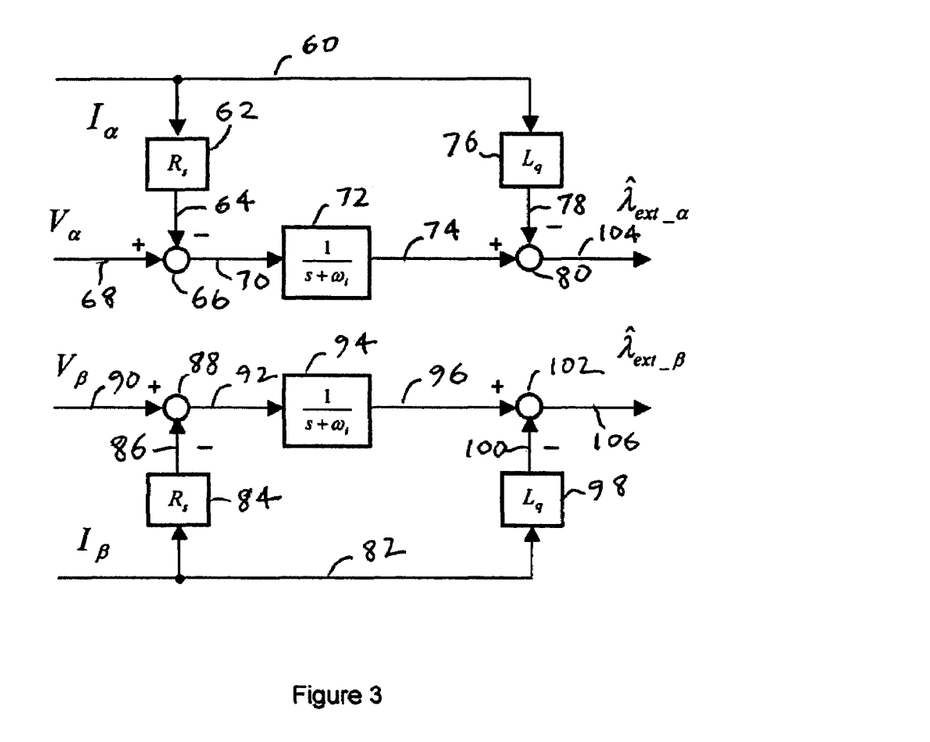
FIG. 3 is a block diagram of the operations performed within the controller that is shown in FIG. 1 to calculate the extended rotor flux.

FIG. 3 is a block diagram of the operations within the controller 22 to calculate the extended rotor flux described above in accordance with equation (2), except that a special lag function $$\frac{1}{s+\omega_i}$$

is substituted for the pure integrator $$\frac{1}{s},$$

wherein $\omega_i$ is a corner frequency of the lag function. The transformed measured current $I_\alpha$ for the α-axis on a signal path 60 is multiplied by an $R_s$ function 62 to produce $I_\alpha*R_s$ on a signal path 64. A summer 66 subtracts $I_\alpha*R_s$ on the signal path 64 from the transformed measured potential $V_\alpha$ on a signal path 68 to produce $V_\alpha-(I_\alpha*R_s)$ on a signal path 70.

$V_\alpha-(I_\alpha*R_s)$ on the signal path 70 is multiplied by the $$\frac{1}{s+\omega_i}$$

lag function 72 described above to produce $$\frac{1}{s+\omega_i}(V_\alpha-(I_\alpha*R_s))$$

on a signal path 74.

The transformed measured current $I_\alpha$ for the α-axis on the signal path 60 is also multiplied by an $L_q$ function 76 to produce $I_\alpha*L_q$ on a signal path 78. Another summer 80 subtracts $I_\alpha*L_q$ on the signal path 78 from $$\frac{1}{s+\omega_i}(V_\alpha-(I_\alpha*R_s))$$

on the signal path 74 to produce the estimated α-axis extended rotor flux $\lambda_{ext\_\alpha}$ as represented by $$\frac{1}{s+\omega_i}(V_\alpha-(I_\alpha*R_s))-I_\alpha*L_q.$$

Similarly, the β-axis extended rotor flux $\lambda_{ext\_\beta}$ is estimated. The transformed measured current $I_\beta$ for the β-axis on a signal path 82 is multiplied by another $R_s$ function 84 to produce $I_\beta*R_s$ on a signal path 86. Another summer 88 subtracts $I_\beta*R_s$ on the signal path 86 from the transformed measured potential $V_\beta$ on a signal path 90 to produce $V_\alpha-(I_\beta*R_s)$ on a signal path 92.

$V_\beta-(I_\beta*R_s)$ on the signal path 92 is multiplied by another $$\frac{1}{s+\omega_i}$$

lagging function 94 described above to produce $$\frac{1}{s+\omega_i}(V_\alpha-(I_\alpha*R_s))$$

on a signal path 96. The transformed measured current $I_\beta$ for the β-axis on the signal path 82 is also multiplied by another $L_q$ function 98 to produce $I_\beta*L_q$ on a signal path 100. Another summer 102 subtracts $I_\beta*L_q$ on the signal path 100 from $$\frac{1}{s+\omega_i}(V_\beta-(I_\beta*R_s))$$

on the signal path 96 to produce the estimated β-axis extended rotor flux $\lambda_{ext\_\beta}$ as represented by $$\frac{1}{s+\omega_i}(V_\beta-(I_\beta*R_s))-I_\beta*L_q.$$

The lag function $$\frac{1}{s+\omega_i}$$

approximates the integration $$\frac{1}{s}$$

very well for the machine speed above its corner frequency $\omega_i$. The corner frequency $\omega_i$ of the lag function $$\frac{1}{s+\omega_i}$$

can be either a fixed number or an adjustable value. In the case of using an adjustable corner frequency, $\omega_i$ is recommended to be a function of the estimated speed as defined in the following equation, where k is the gain and $\hat{\omega}$ is the estimated angular velocity of the dynamoelectric machine, as further described below.

$$\omega_i = k*\hat{\omega} \qquad (3)$$

Figure 4:
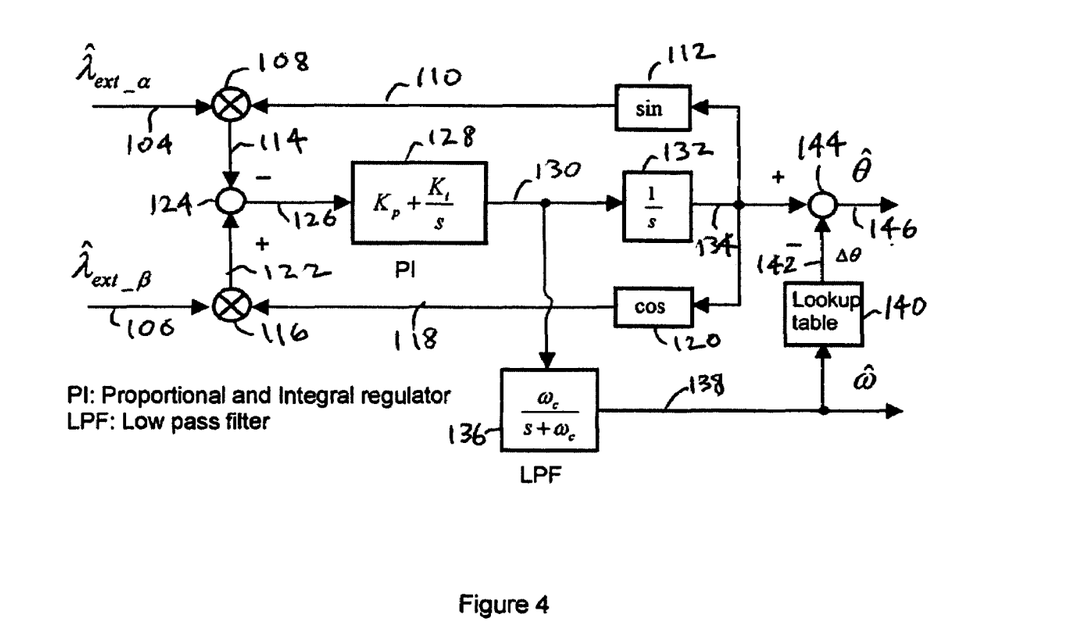
FIG. 4 is a block diagram of elements in the controller that is shown in FIG. 1 to estimate rotor angular position and velocity for the dynamoelectric machine utilising a phase lock loop (PLL).

FIG. 4 is a block diagram of elements in the controller 22 to estimate rotor angular position and velocity for the dynamoelectric machine 10 utilising a phase lock loop (PLL). The estimated α-axis extended rotor flux $\lambda_{ext\_\alpha}$ and the estimated β-axis extended rotor flux $\lambda_{ext\_\beta}$ as derived above in the controller 22 are applied to signal paths 104 and 106, respectively. A multiplier 108 multiplies the estimated α-axis extended rotor flux $\lambda_{ext\_\alpha}$ with a feedback signal on a signal path 110 from a sine function 112 to produce a α-axis multiplier output signal on a signal path 114. Likewise, a multiplier 116 multiplies the estimated β-axis extended rotor flux $\lambda_{ext\_\beta}$ with a feedback signal on a signal path 118 from a cosine function 120 to produce a β-axis multiplier output signal on a signal path 122.

A summer 124 subtracts the α-axis multiplier output signal on the signal path 114 from the β-axis multiplier output signal on a signal path 122 to produce a difference signal on a signal path 126. A proportional plus integral regulator (PI) function 128 multiplies the difference signal on the signal path 126 by the function $$K_p + \frac{K_i}{s}$$

to produce a PI output signal on a signal path 130, wherein $K_p$ and $K_i$ are the proportional and integral gains of the PI function 128, respectively.

An integral function 132 multiplies the PI output signal on the signal path 130 by the function $$\frac{1}{s}$$

to produce an integration output signal on a signal path 134. The integration output signal on the signal path 134 is also fed into the inputs of the sine function 112 and the cosine function 120 to provide the PLL.

A low pass filter (LPF) function 136 multiplies the PI output signal on the signal path 130 by the function $$\frac{\omega_s}{s+\omega_c},$$

where $\omega_c$ is the corner frequency of the LPF function 136 to produce the estimated rotor angular velocity $\hat{\omega}$ on a signal path 138. The LPF function 136 is recommended to better attain a smooth signal for the estimated rotor angular velocity $\hat{\omega}$.

The integration output signal on the signal path 134 is the estimated rotor angular position $\hat{\theta}$ offset by a phase delay $\Delta\theta$ introduced by the lag functions 72, 94 described above in connection with FIG. 3. A lookup table 140 may be used to compensate for this phase delay $\Delta\theta$. The $\Delta\theta$ can be calculated off-line. In the case of using adjustable corner frequency as described in equation (3), we can use a constant number to compensate the error as shown in the following equation.

$$\Delta\theta = \arctan\left(\frac{\omega_i}{\hat{\omega}}\right) = \arctan(k) \qquad (4)$$

The lookup table 140 generates a suitable phase delay $\Delta\theta$ on a signal path 142 based on the estimated rotor angular velocity on the signal path 138, and a summer 144 subtracts the phase delay $\Delta\theta$ from the integration output signal on the signal path 134 to produce the estimated rotor angular position $\hat{\theta}$ on a signal path 146.

The sensorless rotor angular position and velocity sensing system for a dynamoelectric machine that is based on dynamoelectric machine extended flux estimation as described above operational advantages of the back EMF based method, as it works quite well at high angular rotor velocity and only requires dynamoelectric machine potential and current measurements for operation. It also has advantages over the back EMF method.

With the back EMF method, the amplitude of the back EMF varies with rotational velocity of the dynamoelectric machine. Since the amplitude of the back EMF varies, the effective gain of the PLL used in such systems to derive estimated rotor angular position and velocity also changes. This can lead to stability issues. The extended rotor flux described in the invention normally has a constant level or very small variation over wide speed range. That makes it easier to achieve stable operation for the PLL implementation. Furthermore, since the extended rotor flux is obtained through a lag function, the noise/signal ratio in the extended flux is much better than that in the back EMF approach. Also, note that it only requires the q-axis inductance of the dynamoelectric machine to calculate the extended rotor flux in the invention. The invention works very well for both salient and non-salient machines.

This extended rotor flux method uses only the dynamoelectric machine potentials and currents as its input variables. It only needs two dynamoelectric machine parameters, stator winding resistance and q-axis stator inductance, to reconstruct the flux signal. The flux calculation is done in stationary frame and is very simple to implement.

Described above is a sensorless rotor angular position and velocity sensing system for a dynamoelectric machine that is based on dynamoelectric machine extended flux estimation. It should be understood that these embodiments of the invention are only illustrative implementations of the invention, that the various parts and arrangement thereof may be changed or substituted, and that the invention is only limited by the scope of the attached claims.

What is claimed is:

1. A method of detecting rotor angular position and velocity sensing for a polyphase alternating current (AC) dynamoelectric machine comprising the steps of:

measuring the AC currents and potentials applied to a stator of the dynamoelectric machine;

transforming the measured currents and potentials to a two-phase α-β stationary frame to produce transformed currents $I_\alpha, I_\beta$ and transformed potentials $V_\alpha, V_\beta$;

multiplying the transformed currents $I_\alpha, I_\beta$ by the resistance $R_s$ of the stator to produce signals $I_\alpha*R_s, I_\beta*R_s$;

subtracting the signals $I_\alpha*R_s, I_\beta*R_s$ from the respective transformed potentials $V_\alpha, V_\beta$ to produce signals $V_\alpha-I_\alpha*R_s, V_\beta-I_\beta*R_s$;

multiplying signals $V_\alpha-I_\alpha*R_s, V_\beta-I_\beta*R_s$; by a lag function $$\frac{1}{s+\omega_i},$$

wherein $\omega_i$ is a selected corner frequency for the lag function, to produce signals $$\frac{1}{s+\omega_i}(V_\alpha - I_\alpha*R_s), \frac{1}{s+\omega_i}(V_\beta - I_\beta*R_s);$$

multiplying the transformed currents $I_\alpha, I_\beta$ by the q-axis inductance $L_q$ of the stator to produce signals $I_\alpha*L_q, I_\beta*L_q$;

subtracting the signals $I_\alpha*L_q, I_\beta*L_q$ from the respective signals $$\frac{1}{s+\omega_i}(V_\alpha - I_\alpha*R_s), \frac{1}{s+\omega_i}(V_\beta - I_\beta*R_s)$$

to produce signal $$\frac{1}{s+\omega_i}(V_\alpha - I_\alpha * R_s) - I_\alpha * L_q, \frac{1}{s+\omega_i}(V_\beta - I_\beta * R_s) - I_\beta * L_q$$

that correspond to extended rotor flux values $\lambda_{ext\_\alpha}, \lambda_{ext\_\beta}$; and applying the extended rotor flux values $\lambda_{ext\_\alpha}, \lambda_{ext\_\beta}$ to a phase lock loop (PLL) to derive estimated rotor angular position and velocity values $\hat{\theta}, \hat{\omega}$ for the dynamoelectric machine.

2. The method of claim 1, wherein the selected corner frequency $\omega_i$ for the lag function is fixed.

3. The method of claim 1, wherein the selected corner frequency $\omega_i$ for the lag function is adjustable.

4. The method of claim 3, wherein the selected corner frequency $\omega_i$ for the lag function is a function of the estimated rotor angular velocity value $\hat{\omega}$ for the dynamoelectric machine according to the relationship $\omega_i = k*\hat{\omega}$, wherein k is the gain.

5. The method of claim 1, wherein the step of applying the extended rotor flux values $\lambda_{ext\_\alpha}, \lambda_{ext\_\beta}$ to a phase lock loop (PLL) to derive estimated rotor angular position and velocity values $\hat{\theta}, \hat{\omega}$ for the dynamoelectric machine comprises the steps of:

multiplying the estimated α-axis extended rotor flux $\lambda_{ext\_\alpha}$ with a sine function feedback signal to produce a α-axis multiplier output signal;

multiplying the estimated β-axis extended rotor flux $\lambda_{ext\_\beta}$ with a cosine function feedback signal to produce a β-axis multiplier output signal;

subtracting the α-axis multiplier output signal from the β-axis multiplier output signal to produce a difference signal;

multiplying the difference signal by a proportional plus integral regulator (PI) function $$K_p + \frac{K_i}{s}$$

to produce a PI output signal, wherein $K_p$ and $K_i$ are the proportional and integral gains of the PI function, respectively;

multiplying the PI output signal by an integral function $$\frac{1}{s}$$

to produce an integration output signal;

multiplying the integration output signal by a sine function to produce the sine feedback signal;

multiplying the integration output signal by a cosine function to produce cosine feedback signal;

wherein the estimated rotor angular position and velocity values $\hat{\theta}, \hat{\omega}$ for the dynamoelectric machine are derived from the PI output and integration output signals.

6. The method of claim 5, further comprising the steps of:

multiplying the PI output signal by a low pass filter (LPF) function $$\frac{\omega_c}{s+\omega_c},$$

where $\omega_c$ is the corner frequency of the LPF function 136 to produce the estimated rotor angular velocity $\hat{\omega}$;

generating a phase delay $\Delta\theta$ based on the value of the estimated rotor angular velocity $\hat{\omega}$; and subtracting the phase delay $\Delta\theta$ from the integration output signal to produce the estimated rotor angular position $\hat{\theta}$.

7. The method of claim 6, wherein the selected corner frequency $\omega_i$ for the lag function is a function of the estimated rotor angular velocity value $\hat{\omega}$ for the dynamoelectric machine according to the relationship $\omega_i = k*\hat{\omega}$, wherein k is the gain, and the phase delay $$\Delta\theta = \arctan\left(\frac{\omega_i}{\hat{\omega}}\right) = \arctan(k).$$

8. A method of detecting rotor angular position and velocity sensing for a polyphase alternating current (AC) dynamoelectric machine comprising the steps of:

measuring the AC currents and potentials applied to a stator of the dynamoelectric machine;

transforming the measured currents and potentials to a two-phase α-β stationary frame to produce transformed currents $I_\alpha, I_\beta$ and transformed potentials $V_\alpha, V_\beta$;

multiplying the transformed currents $I_\alpha, I_\beta$ by the resistance $R_s$ of the stator to produce signals $I_\alpha*R_s, I_\beta*R_s$;

subtracting the signals $I_\alpha*R_s, I_\beta*R_s$ from the respective transformed potentials $V_\alpha, V_\beta$ to produce signals $V_\alpha - I_\alpha*R_s, V_\beta - I_\beta*R_s$;

multiplying signals $V_\alpha - I_\alpha*R_s, V_\beta - I_\beta*R_s$ by a lag function $$\frac{1}{s+\omega_i},$$

wherein $\omega_i$ is a selected corner frequency for the lag function, to produce signals $$\frac{1}{s+\omega_i}(V_\alpha - I_\alpha * R_s), \frac{1}{s+\omega_i}(V_\beta - I_\beta * R_s);$$

multiplying the transformed currents $I_\alpha, I_\beta$ by the q-axis inductance $L_q$ of the stator to produce signals $I_\alpha*L_q, I_\beta*L_q$;

subtracting the signals $I_\alpha*L_q, I_\beta*L_q$ from the respective signals $$\frac{1}{s+\omega_i}(V_\alpha I_\alpha * R_s), \frac{1}{s+\omega_i}(V_\beta - I_\beta * R_s)$$

to produce signals $$\frac{1}{s+\omega_i}(V_\alpha I_\alpha * R_s) - I_\alpha * L_q, \frac{1}{s+\omega_i}(V_\beta - I_\beta * R_s) - I_\beta * L_q$$

that correspond to extended rotor flux values $\lambda_{ext\_\alpha},\lambda_{ext\_\beta}$;

multiplying the estimated α-axis extended rotor flux $\lambda_{ext\_\alpha}$ with a sine function feedback signal from a sine function to produce a α-axis multiplier output signal;

multiplying the estimated β-axis extended rotor flux $\lambda_{ext\_\beta}$ with a cosine function feedback signal from a cosine function to produce a β-axis multiplier output signal;

subtracting the α-axis multiplier output signal from the β-axis multiplier output signal to produce a difference signal;

multiplying the difference signal by a proportional plus integral regulator (PI) function $$K_p + \frac{K_i}{s}$$

to produce a PI output signal, wherein $K_p$ and $K_i$ are the proportional and integral gains of the PI function, respectively;

multiplying the PI output signal by an integral function $$\frac{1}{s}$$

to produce a integration output signal; and multiplying the integration output signal by a sine function to produce the sine feedback signal; and multiplying the integration output signal by a cosine function to produce the cosine feedback signal;

wherein the estimated rotor angular position and velocity values $\hat{\theta},\hat{\omega}$ for the dynamoelectric machine are derived from the PI output and integration output signals.

9. The method of claim 8, wherein the selected corner frequency $\omega_i$ for the lag function is fixed.

10. The method of claim 8, wherein the selected corner frequency $\omega_i$ for the lag function is adjustable.

11. The method of claim 8, wherein the selected corner frequency $\omega_i$ for the lag function is a function of the estimated rotor angular velocity value $\hat{\omega}$ for the dynamoelectric machine according to the relationship $\omega_i = k*\hat{\omega}$, wherein k is the gain.

12. The method of claim 8, further comprising the steps of:

multiplying the PI output signal by a low pass filter (LPF) function $$\frac{\omega_c}{s + \omega_c},$$

where $\omega_c$ is the corner frequency of the LPF function to produce the estimated rotor angular velocity $\hat{\omega}$;

generating a phase delay $\Delta\theta$ based on the value of the estimated rotor angular velocity $\hat{\omega}$; and subtracting the phase delay $\Delta\theta$ from the integration output signal to produce the estimated rotor angular position $\hat{\theta}$.

13. The method of claim 12, wherein the selected corner frequency $\omega_i$ for the lag function is a function of the estimated rotor angular velocity value $\hat{\omega}$ for the dynamoelectric machine according to the relationship $\omega_i = k*\hat{\omega}$, wherein k is the gain, and the phase delay $$\Delta\theta = \arctan\left(\frac{\omega_i}{\hat{\omega}}\right) = \arctan(k).$$

14. A system for detecting rotor angular position and velocity sensing for a polyphase alternating current (AC) dynamoelectric machine comprising:

a reference frame transformation function for transforming measured currents and potentials applied to a stator of the dynamoelectric machine to a two-phase α-β stationary frame to produce transformed currents $I_\alpha,I_\beta$ and transformed potentials $V_\alpha,V_\beta$;

first and second multipliers for multiplying the transformed currents $I_\alpha,I_\beta$ by the resistance $R_s$ of the stator to produce signals $I_\alpha*R_s,I_\beta*R_s$;

first and second summers for subtracting the signals $I_\alpha*R_s,I_\beta*R_s$ from the respective transformed potentials $V_\alpha,V_\beta$ to produce signals $V_\alpha-I_\alpha*R_s,V_\beta-I_\beta*R_s$;

first and second lag functions for multiplying signals $V_\alpha-I_\alpha*R_s,V_\beta-I_\beta*R_s$; by a lag function $$\frac{1}{s+\omega_i},$$

wherein $\omega_i$ is a selected corner frequency for the lag function, to produce signals $$\frac{1}{s+\omega_i}(V_\alpha - I_\alpha * R_s), \frac{1}{s+\omega_i}(V_\beta - I_\beta * R_s);$$

third and fourth multipliers the transformed currents $I_\alpha,I_\beta$ by the q-axis inductance $L_q$ of the stator to produce signals $I_\alpha*L_q,I_\beta*L_q$;

third and fourth summers for subtracting the signals $I_\alpha*L_q,I_\beta*L_q$ from the respective signals $$\frac{1}{s+\omega_i}(V_\alpha - I_\alpha * R_s), \frac{1}{s+\omega_i}(V_\beta - I_\beta * R_s)$$

to produce signals $$\frac{1}{s+\omega_i}(V_\alpha - I_\alpha * R_s) - I_\alpha * L_q, \frac{1}{s+\omega_i}(V_\beta - I_\beta * R_s) - I_\beta * L_q$$

that correspond to extended rotor flux values $\lambda_{ext\_\alpha},\lambda_{ext\_\beta}$; and a phase lock loop (PLL) to derive estimated rotor angular position and velocity values $\hat{\theta},\hat{\omega}$ for the dynamoelectric machine from the extended rotor flux values $\lambda_{ext\_\alpha},\lambda_{ext\_\beta}$.

15. The system of claim 14, wherein the selected corner frequency $\omega_i$ for the lag function is fixed.

16. The system of claim 14, wherein the selected corner frequency $\omega_i$ for the lag function is adjustable.

17. The system of claim 16, wherein the selected corner frequency $\omega_i$ for the lag function is a function of the estimated rotor angular velocity value $\hat{\omega}$ for the dynamoelectric machine according to the relationship $\omega_i = k*\hat{\omega}$, wherein k is the gain.

18. The system of claim 14, wherein the phase lock loop (PLL) to derive estimated rotor angular position and velocity values $\hat{\theta}, \hat{\omega}$ for the dynamoelectric machine from the extended rotor flux values $\lambda_{ext\_\alpha}, \lambda_{ext\_\beta}$ comprises:

a fifth multiplier for multiplying the estimated α-axis extended rotor flux $\lambda_{ext\_\alpha}$ with a sine function feedback signal to produce a α-axis multiplier output signal;

a sixth multiplier for multiplying the estimated β-axis extended rotor flux $\lambda_{ext\_\beta}$ with a cosine function feedback signal to produce a β-axis multiplier output signal;

a fifth summer for subtracting the α-axis multiplier output signal from the β-axis multiplier output signal to produce a difference signal;

a proportional plus integral regulator (PI) function for multiplying the difference signal by a function $$K_p + \frac{K_i}{s}$$

to produce a PI output signal, wherein $K_p$ and $K_i$ are the proportional and integral gains of the PI function, respectively;

an integral function for multiplying the PI output signal by a function $$\frac{1}{s}$$

to produce a integration output signal; and a sine function for multiplying the integration output signal by the sine function to produce the sine feedback signal; and a cosine function for multiplying the integration output signal by the cosine function to produce the cosine feedback signal;

wherein the estimated rotor angular position and velocity values $\hat{\theta}, \hat{\omega}$ for the dynamoelectric machine are derived from the PI output and integration output signals.

19. The system of claim 18, further comprising:

a low pass filter (LPF) for filtering the PI output signal by a LPF function $$\frac{\omega_c}{s + \omega_c},$$

where $\omega_c$ is the corner frequency of the LPF function to produce the estimated rotor angular velocity $\hat{\omega}$;

a look-up table for generating a phase delay $\Delta\theta$ based on the value of the estimated rotor angular velocity $\hat{\omega}$; and a sixth summer for subtracting the phase delay $\Delta\theta$ from the integration output signal to produce the estimated rotor angular position $\hat{\theta}$.

20. The system of claim 19, wherein the selected corner frequency $\omega_i$ for the lag function is a function of the estimated rotor angular velocity value $\hat{\omega}$ for the dynamoelectric machine according to the relationship $\omega_i = k*\hat{\omega}$, wherein k is the gain, and the phase delay $$\Delta\theta = \arctan\left(\frac{\omega_i}{\hat{\omega}}\right) = \arctan(k).$$

21. A system for detecting rotor angular position and velocity sensing for a polyphase alternating current (AC) dynamoelectric machine comprising:

a reference frame transformation function for transforming measured currents and potentials applied to a stator of the dynamoelectric machine to a two-phase α-β stationary frame to produce transformed currents $I_\alpha, I_\beta$ and transformed potentials $V_\alpha, V_\beta$;

first and second multipliers for multiplying the transformed currents $I_\alpha, I_\beta$ by the resistance $R_s$ of the stator to produce signals $I_\alpha*R_s, I_\beta*R_s$;

first and second summers for subtracting the signals $I_\alpha*R_s, I_\beta*R_s$ from the respective transformed potentials $V_\alpha, V_\beta$ to produce signals $V_\alpha-I_\alpha*R_s, V_\beta-I_\beta*R_s$;

first and second lag functions for multiplying signals $V_\alpha-I_\alpha*R_s, V_\beta-I_\beta*R_s$ by a lag function $$\frac{1}{s + \omega_i},$$

wherein $\omega_i$ corner frequency for the lag function, to produce signals $$\frac{1}{s+\omega_i}(V_\alpha - I_\alpha * R_s), \frac{1}{s+\omega_i}(V_\beta - I_\beta * R_s);$$

third and fourth multipliers the transformed currents $I_\alpha, I_\beta$ by the q-axis inductance $L_q$ of the stator to produce signals $I_\alpha*L_q, I_\beta*L_q$;

third and fourth summers for subtracting the signals $I_\alpha*L_q, I_\beta*L_q$ from the respective signals $$\frac{1}{s+\omega_i}(V_\alpha - I_\alpha * R_s), \frac{1}{s+\omega_i}(V_\beta - I_\beta * R_s)$$

to produce signals $$\frac{1}{s+\omega_i}(V_\alpha - I_\alpha * R_s) - I_\alpha * L_q, \frac{1}{s+\omega_i}(V_\beta - I_\beta * R_s) - I_\beta * L_q$$

that correspond to extended rotor flux values $\lambda_{ext\_\alpha}, \lambda_{ext\_\beta}$;

a fifth multiplier for multiplying the estimated α-axis extended rotor flux $\lambda_{ext\_\alpha}$ with a sine function feedback signal to produce a α-axis multiplier output signal;

a sixth multiplier for multiplying the estimated β-axis extended rotor flux $\lambda_{ext\_\beta}$ with a cosine function feedback signal to produce a β-axis multiplier output signal;

a fifth summer for subtracting the α-axis multiplier output signal from the β-axis multiplier output signal to produce a difference signal;

a proportional plus integral regulator (PI) function for multiplying the difference signal by a function $$K_p + \frac{K_i}{s}$$

to produce a PI output signal, wherein $K_p$ and $K_i$ are the proportional and integral gains of the PI function, respectively;

an integral function for multiplying the PI output signal by a function $$\frac{1}{s}$$

to produce a integration output signal; and a sine function for multiplying the integration output signal by the sine function to produce the sine feedback signal; and a cosine function for multiplying the integration output signal by the cosine function to produce the cosine feedback signal;

wherein the estimated rotor angular position and velocity values $\hat{\theta}, \hat{\omega}$ for the dynamoelectric machine are derived from the PI output and integration output signals.

22. The system of claim 21, wherein the selected corner frequency $\omega_i$ for the lag function is fixed.

23. The system of claim 21, wherein the selected corner frequency $\omega_i$ for the lag function is adjustable.

24. The system of claim 21, wherein the selected corner frequency $\omega_i$ for the lag function is a function of the estimated rotor angular velocity value $\hat{\omega}$ for the dynamoelectric machine according to the relationship $\omega_i = k*\hat{\omega}$, wherein k is the gain.

25. The system of claim 21, further comprising:

a low pass filter (LPF) for filtering the PI output signal by a LPF function $$\frac{\omega_c}{s + \omega_c},$$

$\omega_c$ is the corner frequency of the LPF function to produce the estimated rotor angular velocity $\hat{\omega}$;

a look-up table for generating a phase delay $\Delta\theta$ based on the value of the estimated rotor angular velocity $\hat{\omega}$; and a sixth summer for subtracting the phase delay $\Delta\theta$ from the integration output signal to produce the estimated rotor angular position $\hat{\theta}$.

26. The system of claim 25, wherein the selected corner frequency $\omega_i$ for the lag function is a function of the estimated rotor angular velocity value $\hat{\omega}$ for the dynamoelectric machine according to the relationship $\omega_i = k*\hat{\omega}$, wherein k is the gain, and the phase delay $$\Delta\theta = \arctan\left(\frac{\omega_i}{\hat{\omega}}\right) = \arctan(k).$$

* * * * *